UNITED STATES PATENT OFFICE.

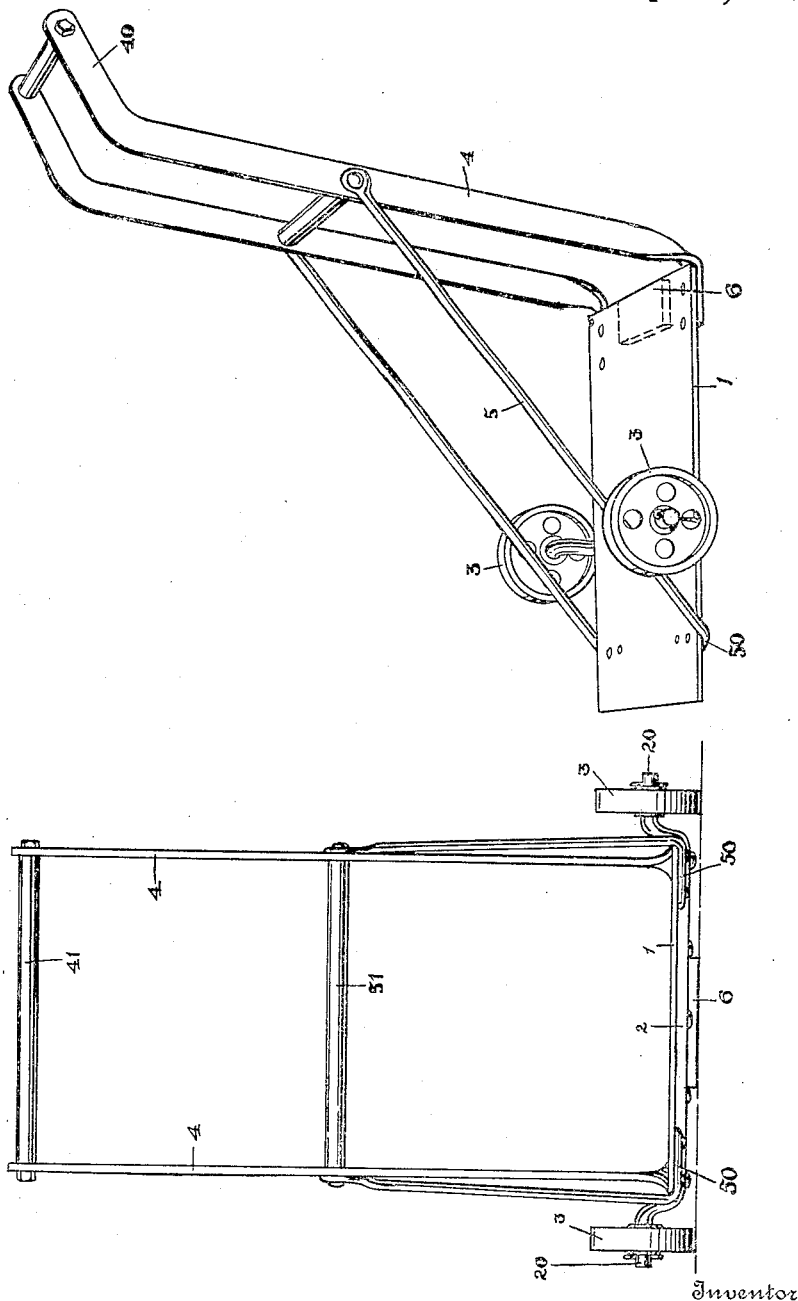

CARL K. CARLSON, OF EVERETT, WASHINGTON.

BOX OR CASE TRUCK.

1,337,438.   Specification of Letters Patent.   Patented Apr. 20, 1920.

Application filed January 23, 1919. Serial No. 272,797.

*To all whom it may concern:*

Be it known that I, CARL K. CARLSON, a citizen of the United States, and resident of the city of Everett, county of Snohomish, and State of Washington, have invented certain new and useful Improvements in Box or Case Trucks, of which the following is a specification.

My invention relates to trucks for handling packages and particularly to a truck which is designed for handling boxes, crates and like packages about a warehouse, factory or the like. The object of my invention is to produce a truck which is especially designed for handling such articles as boxes and crates and particularly where they are stacked up, one upon another, and to do this in such a manner as makes it unnecessary to lift the same about.

My invention consists of a truck having a floor plate which is supported as close to the floor upon which the truck is operated, as is feasible, so that it may be inserted beneath a box or stack of boxes to handle the same with as little difficulty as possible. The particular features of this device which I consider new and upon which I desire a patent, will be hereinafter described, and then defined by the claims terminating this specification.

In the accompanying drawings I have shown my invention embodied in the type of construction which I now prefer to use.

Figure 1, is a front elevation of my truck.

Fig. 2 shows the same in perspective.

The truck which is herein shown and which is the object of my invention, was originally designed for handling crates of bottled milk. It is evident that whatever advantages it has for handling this particular product, will apply also to handling boxes and crates of any type. In handling goods of this character it is a matter of convenience to have the truck so constructed that it may be put in place under the crates or boxes, with as little difficulty as possible. For this purpose and for other purposes which will appear hereinafter, I provide as the supporting means for the crates, a plate 1, which is of rolled or wrought metal. This plate is made of a size corresponding somewhat with the size of the crates to be handled. This does not mean that it should be of the full or exact size of the crate, but of such a size that it may be inserted under piles of crates and furnish a bearing of satisfactory size to suitably support the crates or boxes.

This plate is supported upon an axle, 2, which is preferably made as a flat bar of iron, secured to and extending across beneath the plate, 1. At the edges of the plate the axle projects and it is turned upward and then bent laterally to form the bearing journals, 20 upon which are journaled the supporting wheels, 3. The offset of the axle will be such that the wheel supports the bottom or floor plate, 1. at as little a distance above the floor as the truck may be conveniently operated.

Secured to the rear end of the bottom or floor plate, 1, are two arms, 4. These arms are preferably made of flat bar iron and have their lower ends given a quarter turn twist and bent to extend beneath the floor plate, 1 to which they are secured by riveting. These bars, 4, are preferable secured to the plate at the rear outer corner. It would, of course, be entirely feasible to secure these bars at other points toward the rear of the plate, if this be desired, but the point indicated is the natural one and that where I prefer to secure them.

These bars, 4, extend upwardly approximately in a vertical position, or at right angles to plate, 1. As illustrated they slightly incline to the rear. At their upper ends, the bars, 4, may be laterally bent toward the rear as shown at 40. The handle consists of a bar or pipe section, 41, which is secured between the upper ends of the bars 4.

In order to thoroughly brace the floor section and the arms, 4, I employ two brace rods, 5, these having their forward ends provided with an eye, and bent to extend beneath plate 1, where they are secured by a rivet or bolt. This securing member should have its upper end countersunk in the plate 1, so as to leave a smooth unobstructed surface, for the top of the plate. The upper ends of brace rods 5, are secured to the handle arms, 4, at an intermediate point, and the two arms, 4, will also preferably be connected by a bar, 51, which may suitably serve also as means for securing the upper ends of the brace rods, 5.

I prefer to secure to the under side of the plate 1, at its rear end, a small block, 6, of iron which will serve as the support for this end of the plate, and thus maintain the truck in a practically level position.

The location of the wheels, 3, and the axle is preferably somewhat forward of the center of the plate, 1, so that when the truck is loaded it will be held in substantial equilibrium by resting on wheels 3 and the block 6.

In using this device the plate 1, being held quite low, may be very easily inserted beneath a pile of crates or boxes. To do this it is necessary to tip the boxes very little. The plate being thin may then be easily inserted beneath the boxes or crates and also may be pushed back until it reaches the rear to the farthest side. In consequence the boxes or crates may be securely placed upon the truck with very little effort. When so placed the truck may be run over the floor to any point desired and may be left with the crates in position on the truck without there being any danger of the stack tipping over; also it is very easy to discharge the stack of boxes or crates from the truck.

It will be noticed that the brace rods, 5, are located in line with side edges of the plate, 1, so that the boxes or crates may be placed between them.

What I claim as my invention is:

A truck for handling boxes, crates and like packages, comprising a floor plate, a drop axle secured to said plate forward of its center and wheels on said axle for supporting the plate slightly above a floor, a block secured beneath the floor plate rearward of its center, arms extending upward from the rear corners of the floor plate and turned rearwardly at their upper ends, cross bars connecting the arms at an intermediate point and at their ends and braces connecting said arms with the forward end of the floor plate at the side edges thereof.

Signed at Everett, Washington, this 11th day of January, 1919.

CARL K. CARLSON.